(12) United States Patent
Shen

(10) Patent No.: US 11,894,713 B2
(45) Date of Patent: Feb. 6, 2024

(54) POWER SUPPLY CIRCUIT PROVIDING CONTROL OVER ADAPTIVE CHARGING AND CHARGING CAPABILITY, POWER SUPPLY UNIT THEREOF, AND CHARGING CONTROL METHOD THEREOF

(71) Applicant: Ark Semiconductor Corp. Ltd., Shenzhen (CN)

(72) Inventor: Yi-Lun Shen, Taipei (TW)

(73) Assignee: ARK MICROELECTRONIC CORP. LTD., Shenzhen (CN)

( * ) Notice: Subject to any disclaimer, the term of this patent is extended or adjusted under 35 U.S.C. 154(b) by 531 days.

(21) Appl. No.: 17/200,884

(22) Filed: Mar. 14, 2021

(65) Prior Publication Data
US 2022/0200323 A1    Jun. 23, 2022

(30) Foreign Application Priority Data
Dec. 23, 2020   (TW) ................. 109145697

(51) Int. Cl.
*H02J 7/06*    (2006.01)
*H02M 1/08*    (2006.01)
*H02M 7/217*   (2006.01)

(52) U.S. Cl.
CPC ............... *H02J 7/06* (2013.01); *H02M 1/08* (2013.01); *H02M 7/217* (2013.01)

(58) Field of Classification Search
USPC ........................................ 320/137
See application file for complete search history.

(56) References Cited

U.S. PATENT DOCUMENTS

| 8,976,547 B2 | 3/2015 | Ren | |
|---|---|---|---|
| 2010/0164579 A1* | 7/2010 | Acatrinei | H02M 1/4208 327/172 |
| 2013/0077369 A1 | 3/2013 | Swaminathan | |
| 2014/0300274 A1* | 10/2014 | Acatrinei | H05B 45/3578 315/122 |
| 2016/0190916 A1 | 6/2016 | Tang | |

(Continued)

FOREIGN PATENT DOCUMENTS

| CN | 105811770 A | 7/2016 |
|---|---|---|
| CN | 107888093 A | 4/2018 |

(Continued)

*Primary Examiner* — Mohammed Alam
(74) *Attorney, Agent, or Firm* — Winston Hsu

(57) ABSTRACT

A voltage supply circuit includes a charging circuit, a window adjustment circuit, a driving voltage adjustment circuit, a sampling and feedback circuit and a storage circuit. The charging circuit includes a modulation input terminal for receiving a control voltage; and an energy supply terminal for selectively outputting a charging energy according to the control voltage. The window adjustment circuit is used to adjust the control voltage according to a sampling output voltage corresponding to an output voltage signal, and output the control voltage. The driving voltage adjustment circuit is used to keep the control voltage within a clamping voltage according to the output voltage signal. The sampling and feedback circuit is used to generate the output voltage signal according to a voltage at the energy supply terminal. The storage circuit is used to store the charging energy to pull up the voltage at the energy supply terminal.

16 Claims, 6 Drawing Sheets

(56) References Cited

U.S. PATENT DOCUMENTS

| | | | |
|---|---|---|---|
| 2017/0287721 A1* | 10/2017 | Wood | .................. H01L 29/7392 |
| 2018/0358835 A1 | 12/2018 | Tian | |
| 2019/0190305 A1 | 6/2019 | Zhang | |
| 2019/0252983 A1 | 8/2019 | Tian | |
| 2022/0200323 A1* | 6/2022 | Shen | ....................... H02M 1/08 |

FOREIGN PATENT DOCUMENTS

| | | |
|---|---|---|
| CN | 209571867 U | 11/2019 |
| JP | 6720410 | 7/2020 |
| TW | I497888 B | 8/2015 |
| TW | I674741 B | 10/2019 |

\* cited by examiner

POWER SUPPLY CIRCUIT PROVIDING CONTROL OVER ADAPTIVE CHARGING AND CHARGING CAPABILITY, POWER SUPPLY UNIT THEREOF, AND CHARGING CONTROL METHOD THEREOF

CROSS REFERENCE TO RELATED APPLICATION

This non-provisional application claims priority of Taiwan patent application No. 109145697, filed on 23 Dec. 2020, included herein by reference in its entirety.

BACKGROUND OF THE INVENTION

1. Field of the Invention

The invention relates to a power supply device, and in particular, to a power supply circuit providing control over adaptive charging and charging capability, a power supply unit, and a charging control method thereof.

2. Description of the Prior Art

The power supply unit is a device for converting an alternating current (AC) power into a stable low-voltage direct current (DC) power. When AC power is provided by the power grid, the input voltage of the power supply unit is generally between 100V and 250V, the input AC frequency is 50 Hz or 60 Hz, and the output voltage may be a stable DC voltage such as 21V, 12V, 5V, or 3.3V. In the related art, a transformer is utilized to step down a high-voltage AC power into low-voltage AC power, and then convert the low-voltage AC power into a DC voltage. Due to the large size of the transformer, the size of the power supply unit cannot be reduced. In addition, in order to provide a wide range of the output voltage, the withstand voltage required by the transformer will be increased, resulting in an increase in the size of high-withstand voltage components and an increase in the size of the power supply unit. Therefore, the large sizes of the power supplies in the related art pose difficulty in the design of portable devices or small electrical appliances.

SUMMARY OF THE INVENTION

According to an embodiment of the invention, a power supply circuit includes a rectifier circuit, a charging circuit, a driving voltage adjustment circuit, a sampling and feedback circuit and a storage circuit. The rectifier circuit is used to receive an input voltage to generate a rectified energy. The charging circuit is coupled to the rectifier circuit and used to receive the rectified energy, and has a modulation input terminal and an energy supply terminal. The modulation input terminal is used to receive a control voltage. The charging circuit is used to selectively output a charging energy at the energy supply terminal according to the control voltage, and stop outputting the charging energy when the rectified energy is higher than a power extraction threshold voltage. The charging energy is positively correlated to the control voltage when the rectified energy is less than the power extraction threshold voltage. The driving voltage adjustment circuit is coupled to the modulation input terminal, and is used to receive an output voltage signal, and control the control voltage to be within a clamping voltage according to the output voltage signal. The sampling and feedback circuit is coupled to the energy supply terminal, and is used to generate the output voltage signal according to a voltage at the energy supply terminal. The storage circuit is coupled to the energy supply terminal, and is used to store the charging energy to pull up the voltage at the energy supply terminal. When the voltage at the energy supply terminal is lower, the driving voltage adjustment circuit controls the clamping voltage to have a higher upper limit according to the output voltage signal. When the voltage at the energy supply terminal is higher, the driving voltage adjustment circuit controls the clamping voltage to have a lower upper limit according to the output voltage signal. The higher upper limit is higher than the lower upper limit.

According to another embodiment of the invention, a charging control method is used in a power supply circuit. The power supply circuit includes a charging circuit, a sampling and feedback circuit and a driving voltage adjustment circuit. The charging circuit is coupled between a rectifier circuit and a storage circuit. The rectifier circuit receives an input voltage to generate a rectified energy. The charging circuit selectively outputs a charging energy according to a control voltage received. The driving voltage adjusting circuit receives an output voltage signal and controls according to the output voltage signal the energy to be less a clamping voltage. The sampling and feedback circuit is coupled to an energy supply terminal and generates the output voltage signal according to a voltage at the energy supply terminal. The charging control method includes comparing a divided voltage of the rectified energy with a power extraction threshold voltage, and starting a power extraction window when the divided voltage is less than the power extraction threshold voltage; in the power extraction window, turning on the charging circuit to output the charging energy to charge the storage circuit, the charging energy being positively correlated to the control voltage; and adjusting the control voltage according to the voltage at the energy supply terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
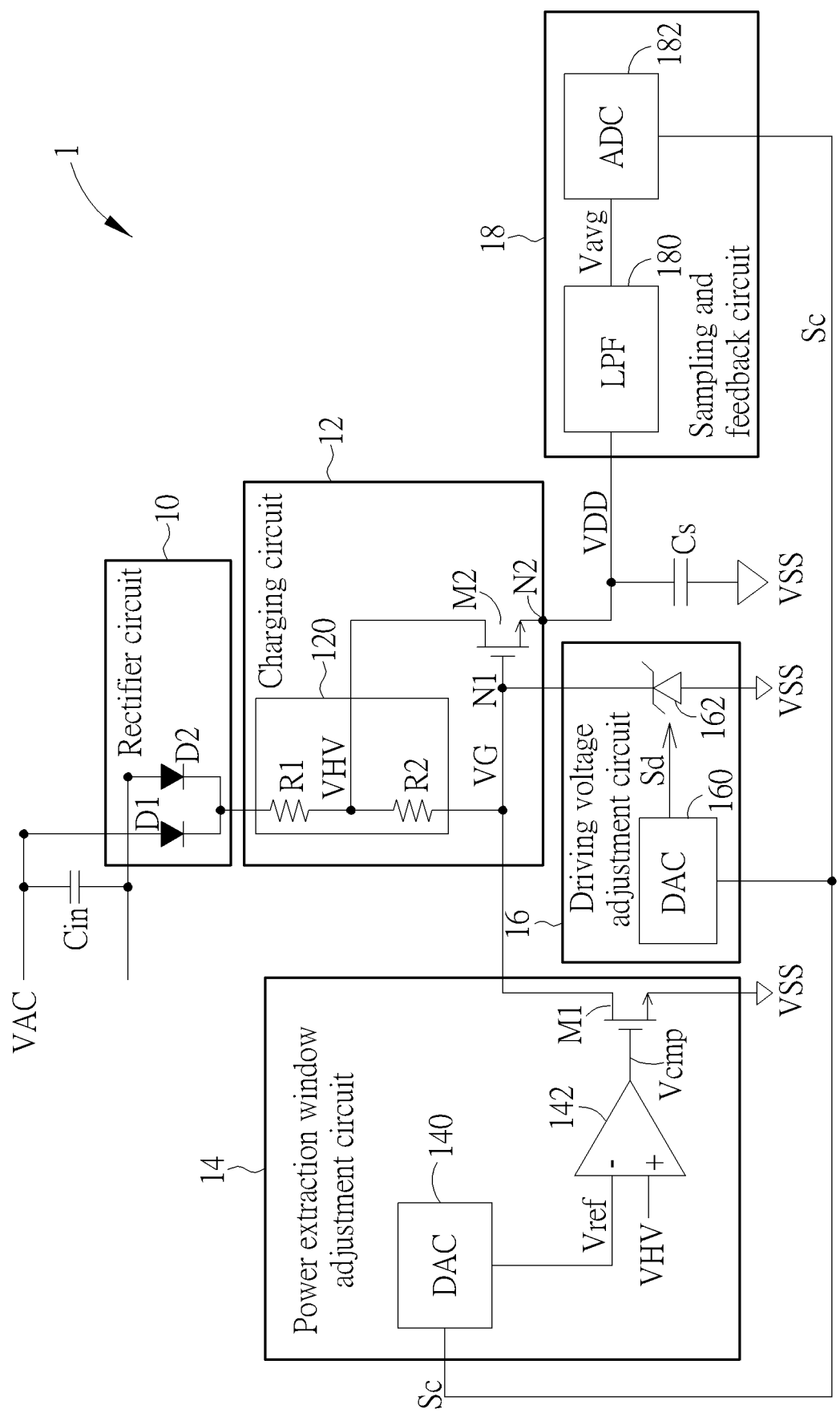
FIG. 1 is a block diagram of a power supply circuit according to an embodiment of the invention.

FIG. 1 is a block diagram of a power supply circuit 1 according to an embodiment of the invention. The power supply circuit 1 may receive an input voltage VAC and provide a suitable voltage VDD according to the input voltage VAC. Specifically, when the input voltage VAC is low, the power supply circuit 1 may receive power from the input voltage VAC for charging to boost the voltage VDD;

when the input voltage VAC is high, the charging is stopped, and the storage circuit Cs continues to provide the voltage VDD, maintaining the voltage VDD within an operating range. In this manner, the input voltage VAC is used to charge the storage circuit Cs only when the input voltage VAC is low, and is disconnected from the storage circuit Cs to stop charging when the input voltage VAC is high, thereby enhancing the operation efficiency and reducing the area of the power supply circuit 1. The input voltage VAC may be supplied by the power grid or other AC supply sources, a root mean square of the input voltage VAC may be between 100V and 240V, and a peak of the input voltage VAC may be between 155 and 373V. When the power supply circuit 1 is used in a flyback power supply (flyback transformer), the input voltage VAC may be an auxiliary winding coil voltage Vaux of the flyback power supply, the auxiliary winding coil voltage Vaux is related to a secondary voltage Vout of the flyback power supply by a turns ratio of the transformer windings, and the secondary voltage Vout may range from 3.3V to 27V. The voltage VDD may be a direct voltage, and may be used as a power source for a pulse width modulator (PWM) at the primary side of the flyback power supply. The voltage VDD may be set to be higher than 8V.

The power supply circuit 1 may include an input capacitor Cin, a rectifier circuit 10, a charging circuit 12, a time window adjustment circuit 14, a driving voltage adjustment circuit 16, a sampling and feedback circuit 18, and the storage circuit Cs. The input capacitor Cin may be coupled to the rectifier circuit 10, the rectifier circuit 10 may be coupled to the charging circuit 12, and the charging circuit 12 may be coupled to the time window adjustment circuit 14, the driving voltage adjustment circuit 16 and the storage circuit Cs. The storage circuit Cs may be coupled to the sampling and feedback circuit 18, and the sampling and feedback circuit 18 may be coupled to the time window adjustment circuit 14.

The input capacitor Cin may receive the input voltage VAC and filter out a high frequency noise from the input voltage VAC, and the rectifier circuit 10 may rectify the filtered input voltage VAC to generate a rectified energy. The voltage of the rectified energy may be referred to as the rectified voltage. The input capacitor Cin includes a first terminal and a second terminal. The rectifier circuit 10 may include a diode D1 and a diode D2. The diode D1 includes a first terminal, coupled to the first terminal of the input capacitor Cin; and a second terminal. The diode D2 includes a first input terminal coupled to the second terminal of the input capacitor Cin; and a second input terminal coupled to the second terminal of the diode D1.

The charging circuit 12 may include a modulation input terminal N1 and an energy supply terminal N2. The time window adjustment circuit 14 and the driving voltage adjustment circuit 16 are coupled to the modulation input terminal N1, and the sampling and feedback circuit 18 is coupled to the energy supply terminal N2. The charging circuit 12 may receive the control voltage VG, and selectively output a charging energy to the energy supply terminal N2 according to the control voltage VG. The charging circuit 12 may include a voltage divider circuit 120 and a second amplifier circuit M2. The voltage divider circuit 120 may be coupled to the rectifier circuit 10 and may receive the rectified voltage to output the divided voltage VHV of the rectified energy. The voltage divider circuit 120 may include a resistor R1 and a resistor R2. The resistor R1 includes a first terminal coupled to the second terminal of the diode D1, and a second terminal. The resistor R2 includes a first terminal coupled to the second terminal of the resistor R1, and a second terminal. The first terminal of the resistor R2 may output the divided voltage VHV. The second amplifier circuit M2 may be coupled to the voltage divider circuit 120, the time window adjustment circuit 14 and the driving voltage adjustment circuit 16, and may selectively generate the charging energy according to the control voltage VG. When the control voltage VG is higher than the threshold voltage of the second amplifier circuit M2, the second amplifier circuit M2 will generate the charging energy, and the charging energy is positively correlated to the control voltage VG. When the control voltage VG is less than the threshold voltage of the second amplifier circuit M2, the second amplifier circuit M2 will stop generating the charging energy. The current of the charging energy may be referred to as the charging current. The second amplifier circuit M2 may be implemented by a transistor, such as an NMOS transistor. The second amplifier circuit M2 may be configured into a voltage follower. If the second amplifier circuit M2 is implemented by an NMOS transistor, the drain terminal of the NMOS transistor may receive the divided voltage VHV, the gate terminal of the NMOS transistor may be the modulation input terminal N1, and the source terminal of the NMOS transistor may be the energy supply terminal N2.

The storage circuit Cs may store the charging energy to pull up the voltage VDD at the energy supply terminal N2. The storage circuit Cs may include a storage capacitor. The storage capacitor includes a first terminal coupled to the energy supply terminal N2; and a second terminal coupled to a ground terminal. The ground terminal may provide a ground voltage VS S, such as 0V. Specifically, the charging current may charge the storage circuit Cs to establish the voltage VDD. The voltage VDD may be output to an external circuit for power supply.

Figure 2:
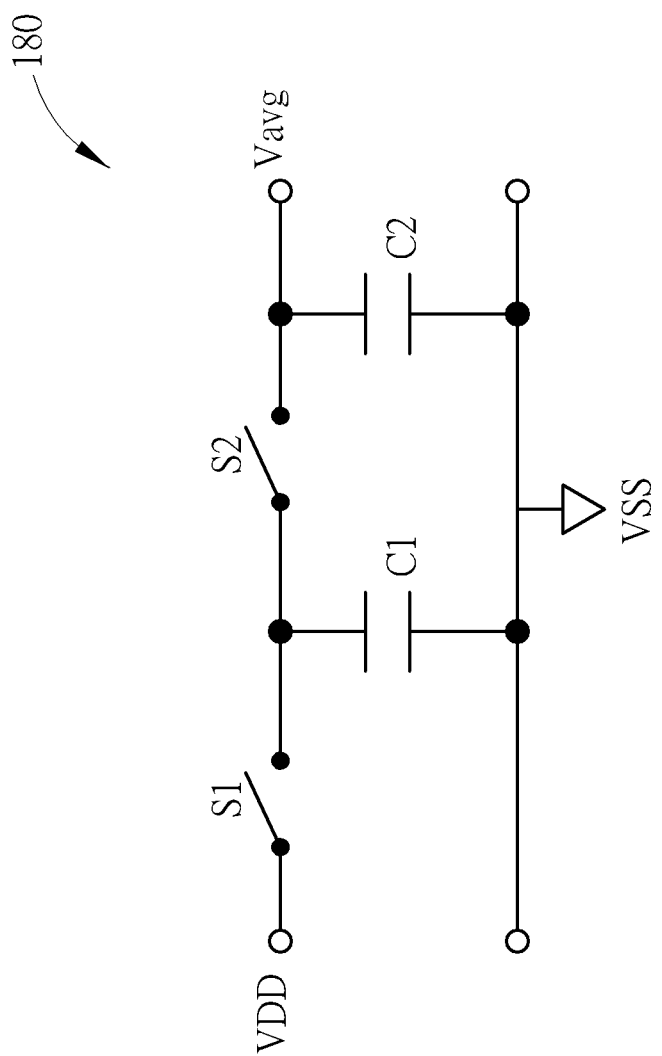
FIG. 2 is a circuit schematic of the low-pass filter in FIG. 1.

The sampling and feedback circuit 18 may generate an output voltage signal Sc according to the voltage VDD at the energy supply terminal N2. The sampling and feedback circuit 18 may include a low-pass filter (LPF) 180 and an analog-to-digital converter (ADC) 182. The low-pass filter 180 includes a first terminal coupled to the storage circuit Cs, and configured to receive the voltage VDD at the energy supply terminal N2 to generate an average voltage Vavg of the voltage VDD; and a second terminal configured to output the average voltage Vavg. The low-pass filter 180 may be implemented by a switched capacitor filter as shown in FIG. 2. FIG. 2 is a circuit schematic of the low-pass filter 180. The low-pass filter 180 may include a first switch S1, a first capacitor C1, a second switch S2 and a second capacitor C2. The first switch S1 includes a first terminal coupled to the storage circuit Cs and configured to receive the voltage VDD at the energy supply terminal N2; and a second terminal. The first capacitor C1 includes a first terminal coupled to the second terminal of the first switch S1; and a second terminal coupled to the ground terminal. The second switch S2 includes a first terminal coupled to the second terminal of the first switch S1, and a second terminal. The second capacitor C2 includes a first terminal coupled to the second terminal of the second switch S2 and configured to output the average voltage Vavg; and a second terminal coupled to the ground terminal. The first switch S1 and the second switch S2 may be switched alternately according to a predetermined switching frequency f. When the first switch S1 is turned on and the second switch S2 is turned off, the first capacitor C1 may be charged and may store charges Qin=C1*VDD. When the first switch S1 is turned off and the second switch S2 is turned on, the first capacitor C1 may be discharged and release charges Qout=C1*Vavg. The charges transferred to the second terminal of the second switch S2 in each switching period is Qtrans=C1*(VDD−Vavg), and the average current in each switching period is Iavg=f*C1*(VDD−Vavg), resulting in an equivalent resistance R of (VDD−Vavg)/Iavg=1/(f*C1). The equivalent resistance R of the first switch S1, the first capacitor C1 and the second switch S2 may be determined by the switching frequency f and the first capacitor C1. The first switch S1, the second switch S2, the first capacitor C1, and the second capacitor C2 may be realized by transistors, and the low-pass filter 180 may output the average voltage Vavg.

Referring to FIG. 1, the analog-to-digital conversion circuit 182 includes a first terminal coupled to the low-pass filter 180; and a second terminal configured to output an output voltage signal Sc. The analog-to-digital conversion circuit 182 may be configured to quantize the average voltage Vavg according to a predetermined signal range and convert the same into the output voltage signal Sc. The quantization may be a uniform quantization or a non-uniform quantization. The output voltage signal Sc may be a digital signal such as a 3-bit digital signal. The analog-to-digital conversion circuit 182 may include a register, such as a 3-bit register configured to store data in the 3-bit digital signal. For example, the predetermined signal range may be 10V to 12V, and the analog-to-digital conversion circuit 182 may divide the predetermined signal range into 8 levels. When the average voltage Vavg is higher than 12V, the analog-to-digital conversion circuit 182 may generate the minimum value 3b000 as the output voltage signal Sc; and when the average voltage Vavg is less than 10V, the analog-to-digital conversion circuit 182 may generate the maximum value 3b111 as the output voltage signal Sc. The analog-to-digital conversion circuit 182 may quantize the average voltage Vavg closer to the upper limit voltage (e.g., 12V) of the predetermined signal range to generate a smaller voltage signal Sc, and may quantize the average voltage Vavg closer to the lower limit voltage (e.g., 10V) of the predetermined signal range to generate a larger voltage signal Sc. For example, when the average voltage Vavg is 11.6V, the analog-to-digital conversion circuit 182 may generate 3b001 in the output voltage signal Sc; when the average voltage Vavg is 10.4V, the analog-to-digital conversion circuit 182 may generate 3b110 in the output voltage signal Sc.

The time window adjustment circuit 14 may receive the output voltage signal Sc, adjust the control voltage VG according to a power extraction threshold voltage Vref corresponding to the output voltage signal Sc, and output the control voltage VG to the modulation input terminal N1. The time window adjustment circuit 14 may include a digital-to-analog converter (DAC) 140, a comparison circuit 142 and a first amplifier circuit M1. The digital-to-analog conversion circuit 140 may be coupled to the sampling and feedback circuit 18, the comparison circuit 142 may be coupled to the digital-to-analog conversion circuit 140 and the voltage divider circuit 120, and the first amplifier circuit M1 may be coupled to the comparison circuit 142 and the second amplifier circuit M2. The digital-to-analog conversion circuit 140 may perform a digital-to-analog conversion on the output voltage signal Sc to generate a power extraction threshold voltage Vref. The binary value of the output voltage signal Sc may correspond to the analog value of the power extraction threshold voltage Vref. For example, the maximum value 3b111 of the output voltage signal Sc may correspond to the maximum value "100V" of the power extraction threshold voltage Vref, and the minimum value 3b000 of the output voltage signal Sc may correspond to the minimum value "50V" of the threshold voltage Vref. The comparison circuit 142 may receive the power extraction threshold voltage Vref and the divided voltage VHV to generate the comparison voltage Vcmp accordingly. The divided voltage VHV may have a full-wave rectified waveform. The comparison circuit 142 may be an operational amplifier, the operational amplifier including a non-inverting input terminal configured to receive the divided voltage VHV; an inverting input terminal configured to receive the power extraction threshold voltage Vref; and an output terminal configured to output a comparison voltage Vcmp. The first amplifier circuit M1 may generate the control voltage VG according to the comparison voltage Vcmp. The control voltage VG is negatively correlated to the power extraction threshold voltage Vref. The divided voltage VHV of the rectified energy is subtracted from the power extraction threshold voltage Vref to determine a voltage difference, the voltage difference is positively correlated to the comparison voltage Vcmp, and the control voltage VG is negatively correlated to the comparison voltage Vcmp. When the power extraction threshold voltage Vref is higher, the comparison voltage Vcmp will be lower for the same divided voltage VHV, and the control voltage VG will be higher; whereas when the power extraction threshold voltage Vref is lower, the comparison voltage Vcmp will be higher for the same divided voltage VHV, and the control voltage VG will be lower. When the divided voltage VHV is higher than the power extraction threshold voltage Vref, the comparison voltage Vcmp may be positive, and the first amplifier circuit M1 will be turned on to generate a control voltage VG less than the threshold voltage of the second amplifier circuit M2, thereby turning off the second amplifier circuit M2 to stop outputting the charging energy and stop charging the storage circuit Cs. That is, the power extraction window ends, and the charging circuit 12 stops extracting power from the divided voltage VHV and stops generating charging current. When the divided voltage VHV is less than the power extraction threshold voltage Vref, the comparison voltage Vcmp may be negative, the first amplifier circuit M1 will be turned off to generate a control voltage VG higher than the threshold voltage of the second amplifier circuit M2, and then the second amplifier circuit M2 will be turned on to output the charging energy to the storage circuit Cs for charging. That is, the power extraction window starts and the charging circuit 12 starts to extract power from the divided voltage VHV, and the charging energy is positively correlated to the control voltage VG.

The driving voltage adjusting circuit 16 may receive the output voltage signal Sc, and control the control voltage VG to be less than the clamping voltage according to the output voltage signal Sc. The clamping voltage may be the upper limit voltage of the control voltage VG. When the voltage VDD at the energy supply terminal N2 is low, the corresponding output voltage signal Sc will result in a higher clamping voltage, thus increasing the charging capacity of the power supply circuit 1. When the voltage VDD at the energy supply terminal N2 is high, the corresponding output voltage signal Sc will result in a lower clamping voltage, thus decreasing the charging capacity of the power supply circuit 1. The driving voltage adjustment circuit 16 may include a digital-to-analog conversion circuit 160 and a set of diodes 162. The digital-to-analog conversion circuit 160 may be coupled to the sampling and feedback circuit 18, and the sampling-to-analog conversion circuit 18 may be coupled to the digital-to-analog conversion circuit 160 and the charging circuit 12. The digital-to-analog conversion circuit 160 may perform a digital-to-analog conversion on the output voltage signal Sc to generate a charging capability control signal Sd. The set of diodes 162 may provide a clamping voltage according to the charging capability control signal Sd. When the average voltage Vavg is higher, the set of diodes 162 may provide a lower clamping voltage according to the charging capability control signal Sd. When the average voltage Vavg is lower, the set of diodes 162 may provide a higher clamping voltage according to the charging capability control signal Sd.

The output voltage signal Sc may be configured to control the power extraction window and the clamping voltage of the control voltage VG. When the average voltage Vavg increases, the output voltage signal Sc will decrease, shortening the power extraction window and reducing the clamping voltage of the control voltage VG. When the average voltage Vavg decreases, the output voltage signal Sc will increase, expanding the power extraction window and increasing the clamping voltage of the control voltage VG. The power supply circuit 1 directly receives the power from the input voltage VAC to generate the voltage VDD, and adjusts the power extraction window and the clamping voltage of the control voltage VG according to the average voltage Vavg of the voltage VDD, so as to maintain the voltage VDD within the operating range, enhancing operating efficiency while reducing the circuit area.

Figure 3:
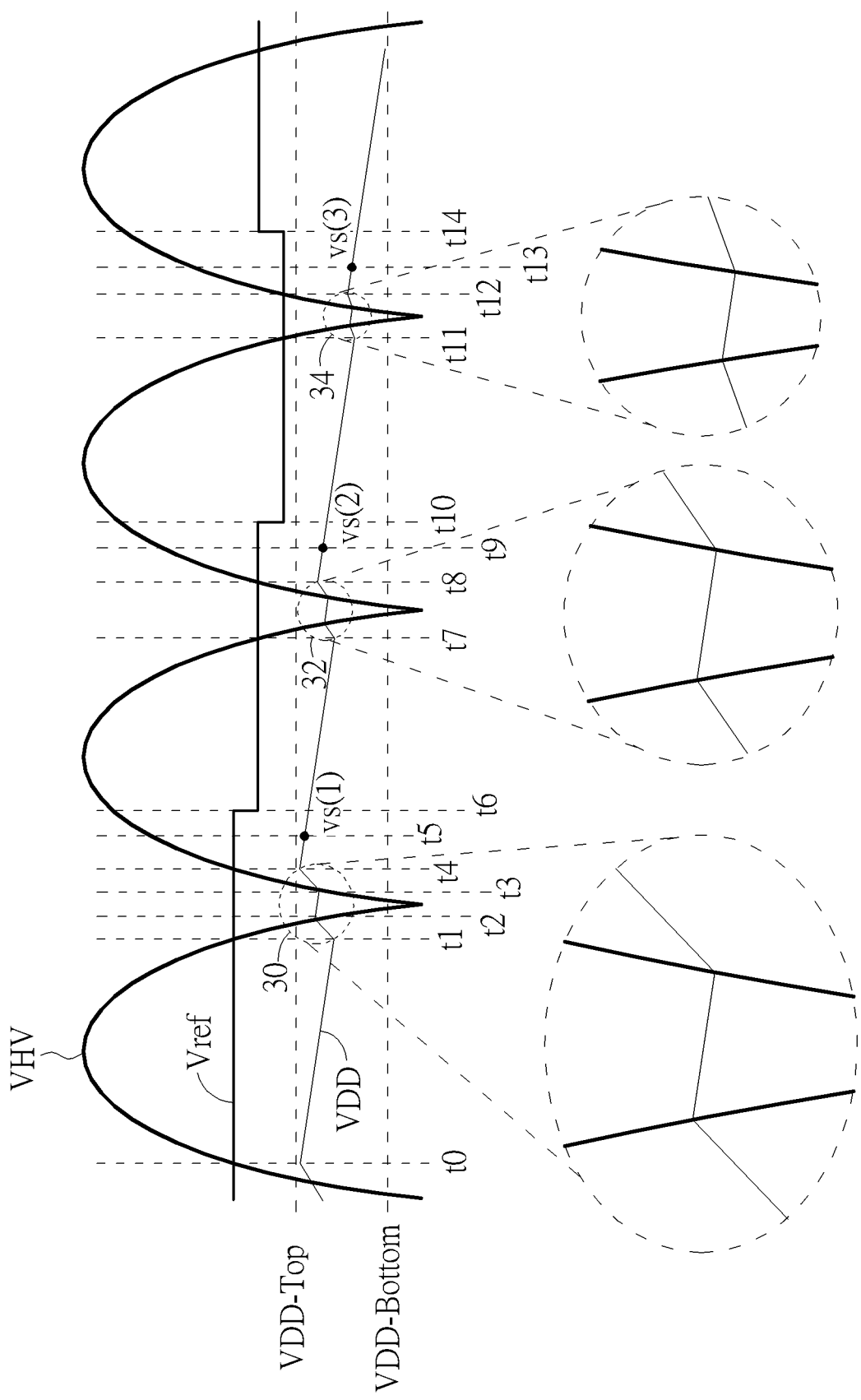
FIG. 3 shows waveforms of the power supply circuit in FIG. 1.

FIG. 3 shows waveforms of the power supply circuit 1, including 3 power extraction windows. The first power extraction window occurs between Times t1 and t4, the second power extraction window occurs between Times t7 and t8, and the third power extraction window occurs between Times t11 and t12. In the 3 power extraction windows, the charging circuit 12 charges the storage circuit Cs and the voltage VDD increases accordingly; outside the 3-power extraction window, the storage circuit Cs is discharged and the voltage VDD decreases accordingly. The voltage VDD is maintained between the upper limit voltage VDD-Top and the lower limit voltage VDD-Bottom. For example, the upper limit voltage VDD-Top may be 12V, and the lower limit voltage VDD-Bottom may be 10V. Between Times t0 and t1, the divided voltage VHV exceeds the power extraction threshold voltage Vref, the control voltage VG is less than the threshold voltage of the second amplifier circuit M2, the second amplifier circuit M2 is turned off, and the charging circuit 12 stops extracting the power from the divided voltage VHV and stop generating the charging current, reducing the voltage VDD.

Between Times t1 and t4, the divided voltage VHV is less than the power extraction threshold voltage Vref, the control voltage VG is higher than the threshold voltage of the second amplifier circuit M2, the second amplifier circuit M2 is turned on, and the first power extraction window starts. In the first power extraction window, between Times t2 and t3, the divided voltage VHV is lower than the voltage VDD, and the storage circuit Cs is discharged, decreasing the voltage VDD. Between Times t1 and t2 and between Times t3 and t4, the divided voltage VHV is higher than the voltage VDD, the storage circuit Cs extracts the power from the divided voltage VHV and the voltage VDD increases. At Time t4, the first power extraction window ends, and the voltage VDD reaches a peak thereof. Between Times t4 and t7, the divided voltage VHV exceeds the power extraction threshold voltage Vref, the control voltage VG is less than the threshold voltage of the second amplifier circuit M2, the second amplifier circuit M2 is turned off, and the voltage VDD decreases. At Time t5, the sampling and feedback circuit 18 generates an average voltage Vavg according to the voltage VDD. Since the average voltage Vavg is increased compared to a previous power extraction window, the difference between the average voltage Vavg and the upper limit voltage VDD-top decreases, and the output voltage signal Sc will decrease. At Time t6, the time window adjustment circuit 14 updates the power extraction threshold voltage Vref to a lower level according to the output voltage signal Sc.

Between Times t7 and t8, the divided voltage VHV is less than the power extraction threshold voltage Vref, the control voltage VG is higher than the threshold voltage of the second amplifier circuit M2, the second amplifier circuit M2 is turned on, and the second power extraction window starts. In the second power extraction window, when the divided voltage VHV is lower than the voltage VDD, the storage circuit Cs is discharged, decreasing the voltage VDD; when the divided voltage VHV is higher than the voltage VDD, the storage circuit Cs extracts the power from the divided voltage VHV, and the voltage VDD increases. At Time t8, the second power extraction window ends, and the voltage VDD reaches the peak thereof. Since the threshold voltage Vref used in the second power extraction window is less than the power extraction threshold voltage Vref used in the first power extraction window, the second power extraction window is shorter than the first power extraction window. Between Times t8 and t11, the divided voltage VHV exceeds the power extraction threshold voltage Vref, the control voltage VG is less than the threshold voltage of the second amplifier circuit M2, the second amplifier circuit M2 is turned off, and the voltage VDD decreases. At Time t9, the sampling and feedback circuit 18 generates an average voltage Vavg according to the voltage VDD. Since the average voltage Vavg is increased compared to the previous power extraction window, the difference between the average voltage Vavg and the upper limit voltage VDD-top decreases, and the output voltage signal Sc will decrease. At Time t10, the time window adjustment circuit 14 updates the power extraction threshold voltage Vref to an even lower level according to the output voltage signal Sc.

Between Times t11 and t12, the divided voltage VHV is less than the power extraction threshold voltage Vref, the control voltage VG is higher than the threshold voltage of the second amplifier circuit M2, the second amplifier circuit M2 is turned on, and the third power extraction window starts. In the third power extraction window, when the divided voltage VHV is lower than the voltage VDD, the storage circuit Cs discharges, decreasing the voltage VDD; when the divided voltage VHV is higher than the voltage VDD, the storage circuit Cs extracts the power from the divided voltage VHV, and the voltage VDD increases. At Time t12, the third power extraction window ends, and the voltage VDD reaches the peak thereof. Since the threshold voltage Vref used in the third power extraction window is less than the power extraction threshold voltage Vref used in the second power extraction window, the third power extraction window is shorter than the second power extraction window. From Time t12 till the next time the next power extraction window starts, the divided voltage VHV exceeds the power extraction threshold voltage Vref, the control voltage VG is less than the threshold voltage of the second amplifier circuit M2, the second amplifier circuit M2 is turned off, and the voltage VDD decreases. At Time t13, the sampling and feedback circuit 18 generates an average voltage Vavg according to the voltage VDD. Since the average voltage Vavg is decreased compared to the previous power extraction window, the difference between the average voltage Vavg and the upper limit voltage VDD-top increases, and the output voltage signal Sc will increase. At Time t14, the time window adjustment circuit 14 updates the power extraction threshold voltage Vref to a higher level according to the output voltage signal Sc.

FIG. 3 includes partial enlarged views 30, 32, and 34 of the voltage VDD in the first power extraction window, the second power extraction window, and the third power extraction window. Since the driving voltage adjustment circuit 16 generates the clamping voltage according to the output voltage signal Sc, and controls the control voltage VG in order to adjust the charging capability of the power supply circuit 1, and therefore, the voltage VDD in the first power extraction window, the second power extraction window and the third power extraction window will exhibit different rising slopes (charging speeds). A higher clamping voltage corresponds to a larger rising slope; a lower clamping voltage corresponds to a smaller rising slope.

The average voltage Vavg of the first power extraction window is higher than the average voltage Vavg of the previous power extraction window. Therefore, at Time t6 after the first power extraction window, the power extraction window adjustment circuit 14 lowers the power extraction threshold voltage Vref, and the driving voltage adjustment circuit 16 reduces the clamping voltage. Similarly, at Time t10 after the second power extraction window, the power extraction window adjustment circuit 14 further lowers the power extraction threshold voltage Vref, and the driving voltage adjustment circuit 16 further reduces the clamping voltage. In contrast, the average voltage Vavg of the third power extraction window is lower than the average voltage Vavg of the second power extraction window. Therefore, at Time t14 after the third power extraction window, the power extraction window adjustment circuit 14 raises the power extraction threshold voltage Vref, and the driving voltage adjustment circuit 16 increases the clamping voltage. Since the clamping voltage of the first power extraction window is higher than the clamping voltage of the second power extraction window, and the clamping voltage of the second power extraction window is higher than the clamping voltage of the third power extraction window, the partial enlarged views 30, 32, and 34 show that the charging speed in the first power extraction window is higher than the charging speed in the second power extraction window, and the charging speed in the second power extraction window is higher than the charging speed in the third power extraction window.

Figure 4:
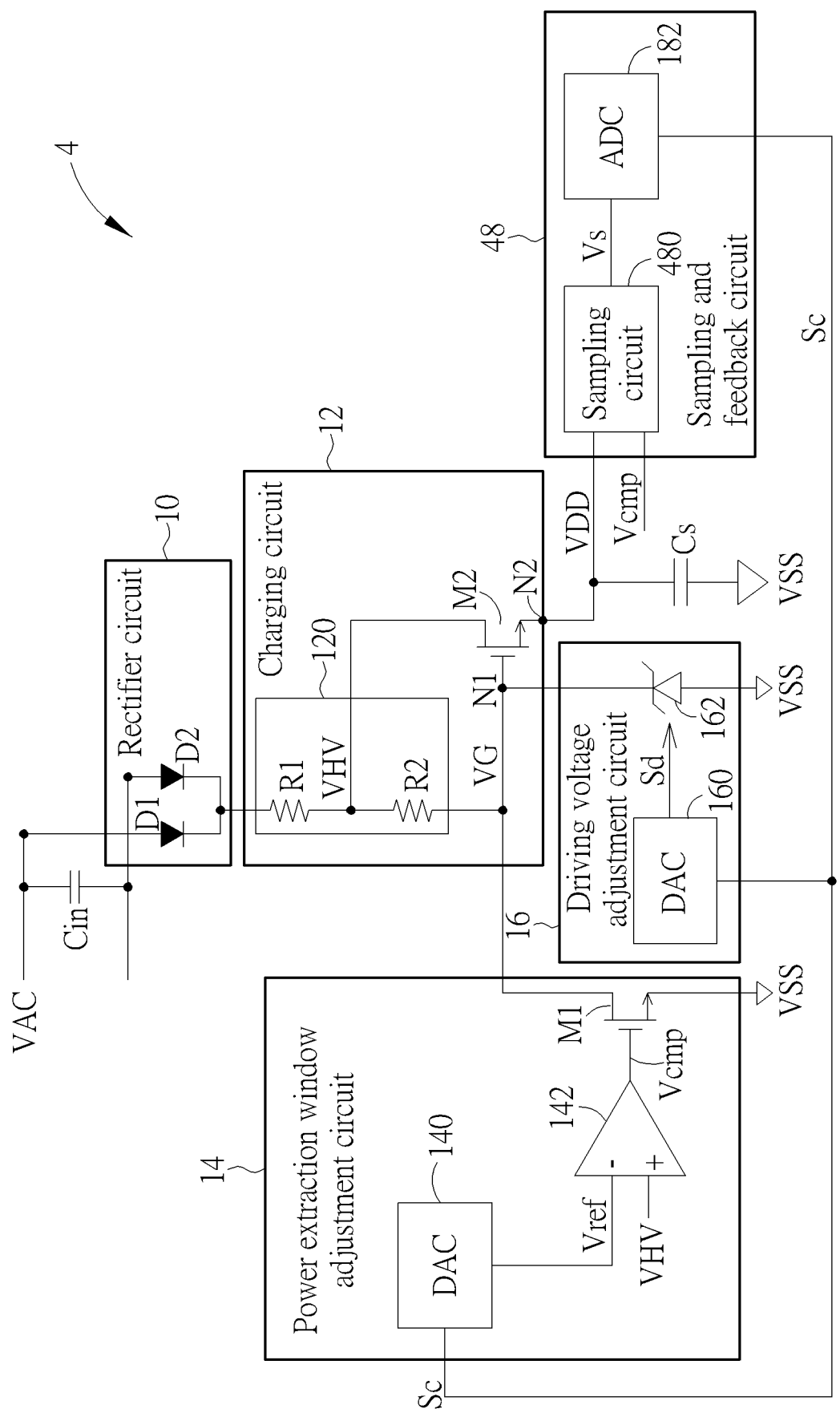
FIG. 4 is a circuit schematic of the low-pass filter in FIG. 1 according to another embodiment of the invention.

FIG. 4 is a circuit schematic of the power supply circuit 4 according to another embodiment of the invention. The difference between the power supply circuit 4 and the power supply circuit 1 lies in the sampling and feedback circuit 48. The following explains the sampling and feedback circuit 48 in detail. The sampling and feedback circuit 48 may include a sampling circuit 480, and an analog-to-digital converter (ADC) 182. The sampling circuit 480 is coupled to the storage circuit Cs, and may generate a sampling voltage Vs by sampling the voltage VDD at the energy supply terminal N2 according to the comparison voltage Vcmp. The analog-to-digital conversion circuit 182 is coupled to the sampling circuit 480, and may convert the sampling voltage Vs into an output voltage signal Sc. The analog-to-digital converters 182 in FIG. 1 and FIG. 4 operate in a similar manner and the explanation therefor will not be repeated here.

In some embodiments, the sampling circuit 480 may sample the voltage VDD of the energy supply terminal N2 after the comparison voltage Vcmp is less than the comparison threshold for a first delay time to generate the sampling voltage Vs. The comparison threshold may be 0V. When the comparison voltage Vcmp is less than the comparison threshold, the second amplifier circuit M2 is turned on, and the sampling circuit 480 may sample the voltage VDD after the second amplifier circuit M2 is turned on for the first delay time to generate the sampling voltage Vs. The first delay time may be longer than or equal to 0. For example, a non-zero second delay time may be selected to obtain a local minimum of the voltage VDD to generate the sampling voltage Vs. In other embodiments, the sampling circuit 480 may sample the voltage VDD of the energy supply terminal N2 after the comparison voltage Vcmp is higher than the comparison threshold for a second delay time to generate the sampling voltage Vs. When the comparison voltage Vcmp is higher than the comparison threshold, the second amplifier circuit M2 is turned off, and the sampling circuit 480 may sample the voltage VDD after the second amplifier circuit M2 is turned off for the second delay time to generate the sampling voltage Vs. The second delay time may be longer than or equal to the 0. A non-zero second delay time may be selected to obtain a local maximum of the voltage VDD to generate the sampling voltage Vs Referring to FIG. 3, after Time t4, the divided voltage VHV exceeds the power extraction threshold voltage Vref, the comparison voltage Vcmp is higher than the comparison threshold (0V), after the comparison voltage Vcmp is higher than the comparison threshold for the first delay time (Time t5), the sampling and feedback circuit 48 samples the voltage VDD to generate the sampling voltage Vs(1). Since the difference between the sampling voltage Vs(1) and the upper limit voltage VDD-top of the voltage VDD is small, the output voltage signal Sc will decrease. At Time t6, the time window adjustment circuit 14 updates the power extraction threshold voltage Vref to a lower level according to the output voltage signal Sc. After Time t8, the divided voltage VHV exceeds the power extraction threshold voltage Vref, and the comparison voltage Vcmp is higher than the comparison threshold (0V). After the comparison voltage Vcmp is higher than the comparison threshold for the first delay time (Time t9), the sampling and feedback circuit 48 generates the sampling voltage Vs(2) according to the voltage VDD. The output voltage signal Sc will decrease as the difference between the sampling voltage Vs(1) and the upper limit voltage VDD-top decreases. At Time t10, the time window adjustment circuit 14 updates the power extraction threshold voltage Vref to an even lower level according to the output voltage signal Sc. After Time t12, the divided voltage VHV exceeds the power extraction threshold voltage Vref, and the comparison voltage Vcmp is higher than the comparison threshold (0V). After the comparison voltage Vcmp is higher than the comparison threshold for the first delay time (Time t13), the sampling and feedback circuit 48 generates the sampling voltage Vs(3) according to the voltage VDD. The output voltage signal Sc will increase as the difference between the voltage sampling voltage Vs(2) and the upper limit voltage VDD-top increases. At Time t14, the time window adjustment circuit 14 updates the power extraction threshold voltage Vref to a higher level according to the output voltage signal Sc.

Since the sampling and feedback circuit 48 obtains the sampling voltage at a predetermined point in time in relation to the power extraction window, it does not need to wait for a full cycle of the voltage VDD to determine the average voltage Vavg, leading to a faster response time, accelerating the adjustment of the power extraction window and the clamping voltage of the control voltage VG, while enabling the power supply circuit 4 to maintain the voltage VDD within the operating range, enhancing the operating efficiency and reducing the circuit area.

Figure 5:
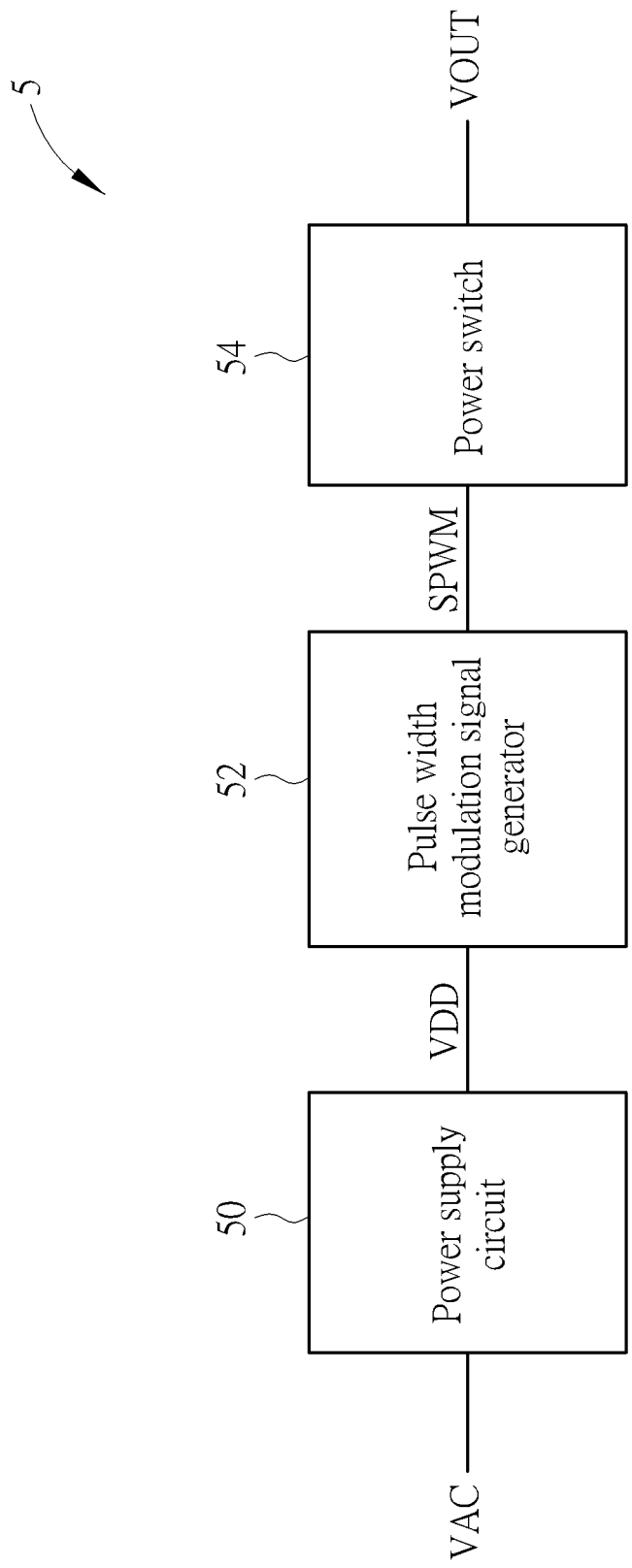
FIG. 5 is a block diagram of a power supply unit according to an embodiment of the invention.

FIG. 5 is a block diagram of a power supply unit 5 according to an embodiment of the invention. The power supply unit 5 includes a power supply circuit 50, a pulse width modulation signal generator 52 and a power switch 54. The power supply circuit 50 may be implemented by the power supply circuit 1 or the power supply circuit 4 to provide the voltage VDD to the pulse width modulation signal generator 54. A pulse width modulation signal generator 52 provides a pulse width modulation signal SPWM to control the power switch 54, the pulse width modulation signal generator 52 is coupled to the energy supply terminal N2 of the power supply circuit, receives the power from the energy supply terminal N2 to maintain the operation of the width modulation signal generator 52. In response to the received pulse width modulation signal SPWM, the power switch 54 may be selectively turned on to perform a power conversion, so that the frequency and duty cycle of the power switch 54 may be adapted according to the pulse width modulation signal SPWM, so as to adjust the output voltage VOUT of the power supply unit 5.

The power supply unit 5 employs the power supply circuit 1 or the power supply circuit 4 to generate the voltage VDD, enhancing the operation efficiency while reducing the circuit area.

Figure 6:
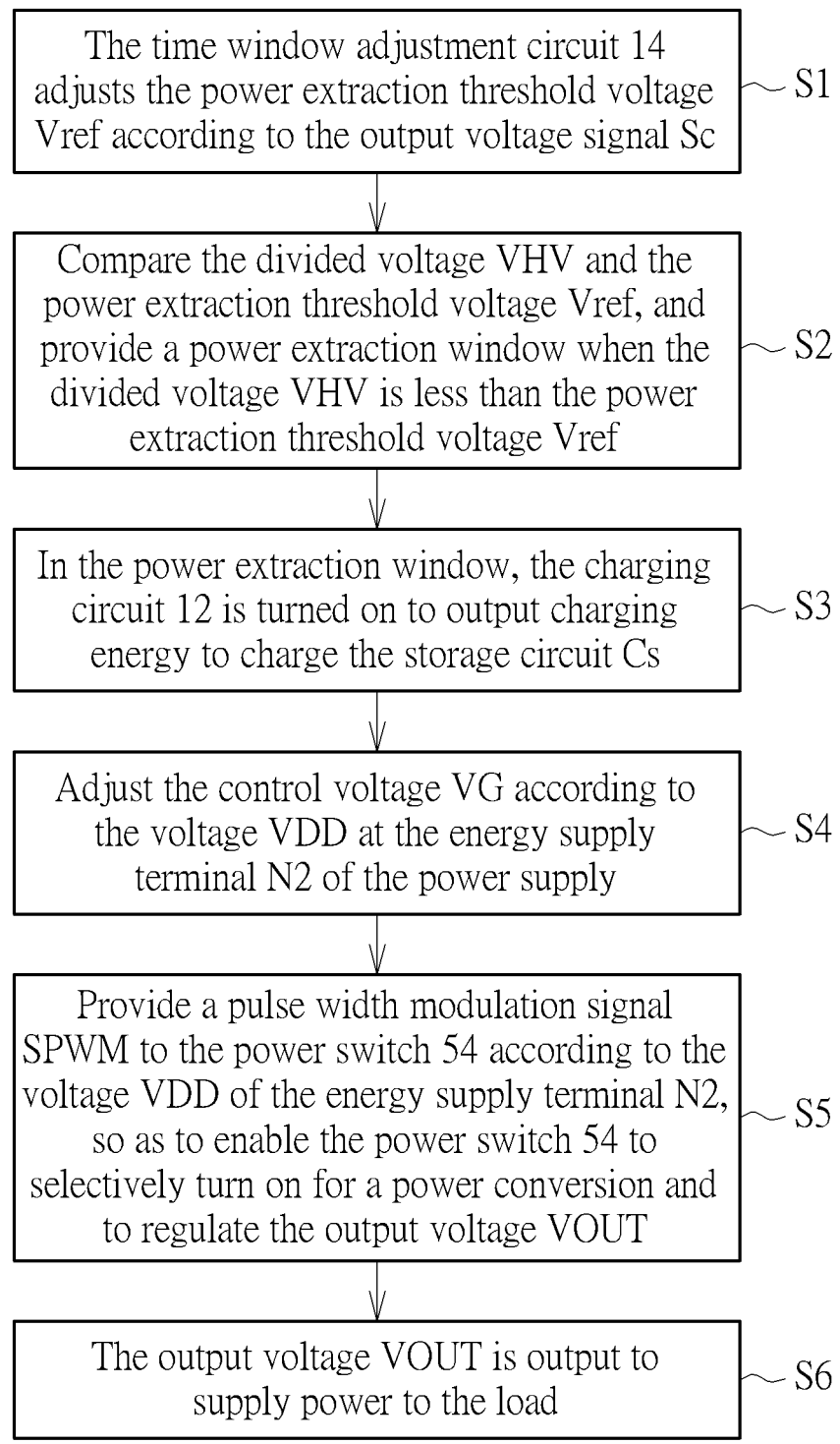
FIG. 6 is a flowchart of a charging control method for controlling the power supply circuit in FIG. 1.

FIG. 6 is a flowchart of a charging control method for controlling the power supply circuit 1. The charging control method includes the following Steps:

Step S1: The time window adjustment circuit 14 adjusts the power extraction threshold voltage Vref according to the output voltage signal Sc;

Step S2: Compare the divided voltage VHV and the power extraction threshold voltage Vref, and provide a power extraction window when the divided voltage VHV is less than the power extraction threshold voltage Vref;

Step S3: In the power extraction window, the charging circuit 12 is turned on to output charging energy to charge the storage circuit Cs, the charging energy being positively correlated to the control voltage VG;

Step S4: Adjust the control voltage VG according to the voltage VDD at the energy supply terminal N2 of the power supply;

Step S5: Provide a pulse width modulation signal SPWM to the power switch 54 according to the voltage VDD of the energy supply terminal N2, so as to enable the power switch 54 to selectively turn on for a power conversion and to regulate the output voltage VOUT;

Step S6: The output voltage VOUT is output to supply power to the load.

In Step S4, when the voltage VDD of the energy supply terminal N2 rises, the control voltage VG is decreased; and when the voltage VDD at the energy supply terminal N2 drops, the control voltage VG is increased. The charging control method adjusts the power extraction window, maintains the voltage VDD within the operating range, enhances operating efficiency, and reduces circuit area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply circuit comprising:
   a rectifier circuit configured to receive an input voltage to generate a rectified energy;
   a charging circuit coupled to the rectifier circuit, configured to receive the rectified energy, and having a modulation input terminal and an energy supply terminal, the modulation input terminal being configured to receive a control voltage, the charging circuit being configured to selectively output a charging energy at the energy supply terminal according to the control voltage, and stop outputting the charging energy when the rectified energy is higher than a power extraction threshold voltage, the outputted charging energy being positively correlated to the control voltage when the rectified energy is less than the power extraction threshold voltage;
   a driving voltage adjustment circuit coupled to the modulation input terminal, and configured to receive an output voltage signal, and control the control voltage to be within a clamping voltage according to the output voltage signal;
   a sampling and feedback circuit coupled to the energy supply terminal, and configured to generate the output voltage signal according to a voltage at the energy supply terminal; and
   a storage circuit coupled to the energy supply terminal, and configured to store the charging energy to pull up the voltage at the energy supply terminal;
   wherein when the voltage at the energy supply terminal is a lower voltage, the driving voltage adjustment circuit controls the clamping voltage to have a higher upper limit according to the output voltage signal corresponding to the lower voltage, when the voltage at the energy supply terminal is a higher voltage, the driving voltage adjustment circuit controls the clamping voltage to have a lower upper limit according to the output voltage signal corresponding to the higher voltage, wherein the lower voltage is lower than the higher voltage, and the higher upper limit is higher than the lower upper limit.

2. The power supply circuit of claim 1, wherein the control voltage is negatively correlated to the power extraction threshold voltage, and a voltage difference between the extraction threshold voltage and a divided voltage of the rectified energy is negatively correlated to the control voltage.

3. The power supply circuit of claim 1, wherein the power supply circuit further comprises a time window adjustment circuit coupled to the modulation input terminal, the time window adjustment circuit receiving the output voltage signal and outputting the control voltage to the modulation input terminal, the time window adjustment circuit being configured to adjust the power extraction threshold voltage according to the output voltage signal, so as to change the control voltage.

4. The power supply circuit of claim 3, wherein the charging circuit further comprises:
   a voltage divider circuit coupled to the rectifier circuit and configured to receive the rectified energy to output a divided voltage of the rectified energy; and
   a second amplifier circuit coupled to the voltage divider circuit, the time window adjustment circuit and the driving voltage adjusting circuit, and configured to generate the charging energy according to the control voltage.

5. The power supply circuit of claim 4, wherein the time window adjustment circuit comprises:
   a comparison circuit coupled to the voltage divider circuit, and configured to receive the power extraction threshold voltage and the divided voltage to generate a comparison voltage accordingly; and a first amplifier circuit coupled to the comparison circuit and the second amplifier circuit, and configured to generate the control voltage according to the comparison voltage.

6. The power supply circuit of claim 5, wherein when the divided voltage is higher than the power extraction threshold voltage, the first amplifier circuit is configured to generate the control voltage less than a threshold voltage.

7. The power supply circuit of claim 5, wherein when the divided voltage is less than the power extraction threshold voltage, the first amplifier circuit is configured to generate the control voltage higher than a threshold voltage.

8. The power supply circuit of claim 5, wherein the time window adjustment circuit further comprises a first digital-to-analog conversion circuit coupled to the sampling and feedback circuit and the comparison circuit, and configured to perform a digital-to-analog conversion on the output voltage signal to generate the power extraction threshold voltage.

9. The power supply circuit of claim 5, wherein the comparison circuit is an operational amplifier comprising a non-inverting input terminal configured to receive the divided voltage, and an inverting input terminal configured to receive the power extraction threshold voltage, and an output terminal configured to output the comparison voltage.

10. The power supply circuit of claim 5, wherein the sampling and feedback circuit comprises:
    a sampling circuit coupled to the storage circuit and configured to sample the voltage at the energy supply terminal according to the comparison voltage to generate a sampling voltage; and
    an analog-to-digital conversion circuit coupled to the sampling circuit and configured to convert the sampling voltage into the output voltage signal.

11. The power supply circuit of claim 10, wherein the sampling circuit is configured to sample the voltage at the energy supply terminal to generate the sampling voltage after the comparison voltage is less than a comparison threshold for a first delay time.

12. The power supply circuit of claim 10, wherein the sampling circuit is configured to sample the voltage of the energy supply terminal to generate the sampling voltage after the comparison voltage is higher than a comparison threshold for a second delay time.

13. The power supply circuit of claim 1, wherein when the control voltage is less than a threshold voltage, the charging circuit stops outputting the charging energy, and when the control voltage is higher than the threshold voltage, the charging energy and the control voltage are positively correlated.

14. The power supply circuit of claim 1, wherein the sampling and feedback circuit comprises:
    a filter coupled to the storage circuit and configured to receive the voltage at the energy supply terminal to generate an average voltage of the energy supply terminal; and
    an analog-to-digital conversion circuit coupled to the filter and configured to convert the average voltage into the output voltage signal.

15. The power supply circuit of claim 14, wherein the filter comprises:
    a first switch comprising a first terminal coupled to the storage circuit and configured to receive the voltage at the energy supply terminal, and a second terminal;
    a first capacitor comprising a first terminal coupled to the second terminal of the first switch, and a second terminal coupled to a ground terminal;
    a second switch comprising a first terminal coupled to the second terminal of the first switch, and a second terminal; and
    a second capacitor comprising a first terminal coupled to the second terminal of the second switch and configured to output the average voltage, and a second terminal coupled to the ground terminal.

16. A power supply unit comprising the power supply circuit of claim 1, wherein the power supply unit further comprises:
    a power switch configured to selectively turn on or turn off to perform a power conversion, so as to regulate an output voltage of the power supply unit; and
    a pulse width modulation signal generator coupled to the energy supply terminal, and configured to receive an energy from the energy supply terminal to maintain an operation of the pulse width modulation signal generator, and provide a pulse width modulation signal to control the power switch.

* * * * *